(12) United States Patent
Goyal et al.

(10) Patent No.: US 12,330,374 B2
(45) Date of Patent: Jun. 17, 2025

(54) PERFORMING CORRECTIVE ACTIONS DURING THREE-DIMENSIONAL PRINTING JOBS

(71) Applicant: International Business Machines Corporation, Armonk, NY (US)

(72) Inventors: Manoj Kumar Goyal, Karnataka (IN); Sarbajit K. Rakshit, Kolkata (IN); Raghuveer Prasad Nagar, Rajasthan (IN); Manjit Singh Sodhi, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 17/468,856

(22) Filed: Sep. 8, 2021

(65) Prior Publication Data

US 2023/0076556 A1 Mar. 9, 2023

(51) Int. Cl.
*B29C 64/393* (2017.01)
*B29C 64/188* (2017.01)
*B29C 64/268* (2017.01)
*B33Y 40/20* (2020.01)
(Continued)

(52) U.S. Cl.
CPC .......... *B29C 64/393* (2017.08); *B29C 64/188* (2017.08); *B29C 64/268* (2017.08); *B33Y 40/20* (2020.01); *B33Y 50/02* (2014.12); *G06T 7/0004* (2013.01); *G06T 2207/20081* (2013.01); *G06T 2207/30164* (2013.01)

(58) Field of Classification Search
CPC ... B29C 64/393; B29C 64/188; B29C 64/268; B33Y 50/02; B33Y 40/20; G06T 7/0004; G06T 2207/20081; G06T 2207/30164
See application file for complete search history.

(56) References Cited

U.S. PATENT DOCUMENTS

| 7,291,002 B2 | 11/2007 | Russell et al. |
| 10,073,424 B2 | 9/2018 | Lin et al. |
| 2014/0175706 A1 | 6/2014 | Kritchman |

(Continued)

FOREIGN PATENT DOCUMENTS

| CN | 103927245 A | 7/2014 |
| JP | 2008513199 A | 5/2008 |

OTHER PUBLICATIONS

Disclosed Anonymously, "System and Method for Connection Determination for 3D Print Objects Split into Multiple Pieces", IPCOM000238711D, Sep. 12, 2014, https://priorart.ip.com/IPCOM/000238711, 3 pages.

(Continued)

*Primary Examiner* — Santosh R Poudel
(74) *Attorney, Agent, or Firm* — Harrity & Harrity, LLP

(57) ABSTRACT

A computer system performs corrective operations during a three-dimensional (3D) printing job. The 3D printing job is initiated to produce a physical object. Printing of the physical object is monitored to identify a defect of the physical object during the printing. The defect is analyzed to determine one or more corrective operations to apply to the physical object. The one or more corrective operations are performed during the printing. Embodiments of the present invention further include a method and program product for performing corrective operations during a 3D printing job model in substantially the same manner described above.

17 Claims, 6 Drawing Sheets

(51) Int. Cl.
*B33Y 50/02* (2015.01)
*G06T 7/00* (2017.01)

(56) References Cited

U.S. PATENT DOCUMENTS

| | | | |
|---|---|---|---|
| 2018/0114703 A1* | 4/2018 | Karni | H05K 3/4664 |
| 2019/0018625 A1* | 1/2019 | Noguchi | G06F 3/1207 |
| 2020/0016883 A1 | 1/2020 | Reese et al. | |
| 2020/0061709 A1* | 2/2020 | Cousineau | B23K 10/027 |
| 2020/0096970 A1 | 3/2020 | Mehr et al. | |
| 2021/0379670 A1* | 12/2021 | Leard | G01B 11/2441 |
| 2022/0062997 A1* | 3/2022 | Liu | B33Y 30/00 |
| 2022/0184880 A1* | 6/2022 | Barnes | B29C 70/38 |
| 2023/0234137 A1* | 7/2023 | Reutzel | B22F 10/366 |
| | | | 382/141 |
| 2023/0294201 A1* | 9/2023 | Niu | B22F 10/80 |
| | | | 219/76.1 |

OTHER PUBLICATIONS

Evgeniy G. Gordeev, et al., "Improvement of quality of 3D printed objects by elimination of microscopic structural defects in fused deposition modeling", Research Article, https://journals.plos.org/plosone/article?id=10.1371/journal.pone.0198370, 19 pages.

* cited by examiner

PERFORMING CORRECTIVE ACTIONS DURING THREE-DIMENSIONAL PRINTING JOBS

BACKGROUND

1. Technical Field

Present invention embodiments relate to three-dimensional (3D) printing, and more specifically, to identifying and correcting defects during 3D printing jobs.

2. Discussion of the Related Art 3D printing, a known as additive manufacturing, is a process that enables physical objects to be created from digital templates, such as computer-aided design (CAD) models. 3D printing can be performed by depositing, joining, or solidifying material under computer control to create a three-dimensional object, with the material typically being added in a layer-by-layer manner. Often, the material is a plastic or similar material that is deposited in a liquefied state and that solidifies upon cooling. A key advantage of 3D printing is the ability to produce complex shapes or geometries that would be difficult or impossible to achieve using conventional manufacturing techniques, including parts with hollow sections or other internal structures. However, the material properties of 3D printed objects may present issues, especially when successively-deposited layers fail to sufficiently bond to each other.

SUMMARY

According to one embodiment of the present invention, a computer system performs corrective operations during a three-dimensional (3D) printing job. The 3D printing job is initiated to produce a physical object. Printing of the physical object is monitored to identify a defect of the physical object during the printing. The defect is analyzed to determine one or more corrective operations to apply to the physical object. The one or more corrective operations are performed during the printing. Embodiments of the present invention further include a method and program product for performing corrective operations during a 3D printing job in substantially the same manner described above.

BRIEF DESCRIPTION OF THE DRAWINGS

Generally, like reference numerals in the various figures are utilized to designate like components.

DETAILED DESCRIPTION

Figure 1:
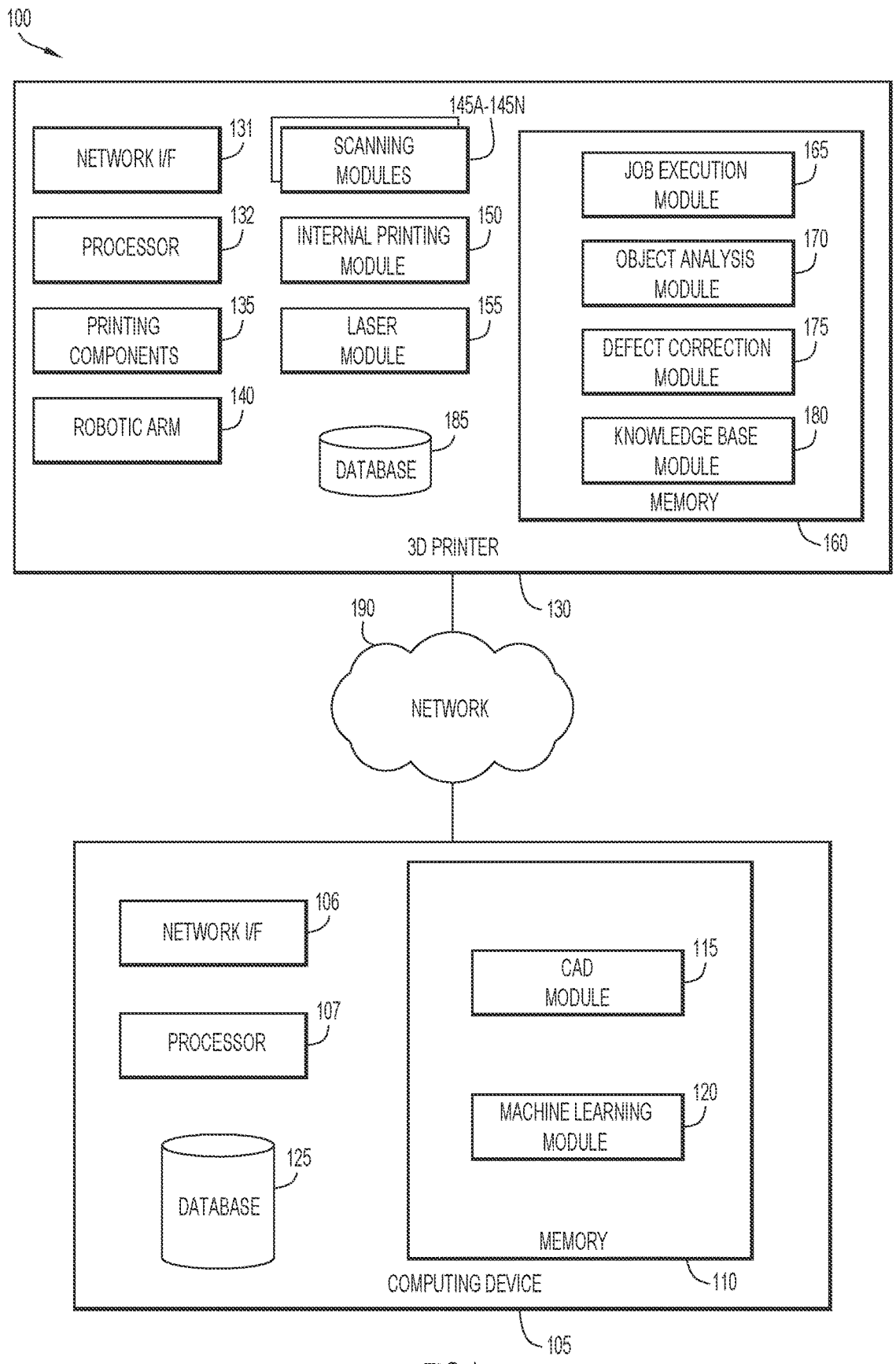
FIG. 1 is a block diagram depicting a 3D printing environment in accordance with an embodiment of the present invention.

Present invention embodiments relate to three-dimensional (3D) printing, and more specifically, to identifying and correcting defects during 3D printing jobs. During a 3D printing job, material is typically deposited in a layer-by-layer fashion, and the overall shape of the object being printed is defined by selectively placing material upon the previously-deposited layer. Since almost any shape can be printed, a 3D printer can create replacement parts, tools, art, toys, and the like.

The types of 3D printed objects, and uses for those objects, can be limited by the material properties of the printed material, which is typically a plastic. For example, a 3D printed object may be limited by the tensile strength of its material and may therefore be unsuitable for certain use-cases. Additionally, an object printed merely for aesthetic purposes may include complex geometries and, therefore, may not be able to support itself when some portions are too thin to bear the weight of other portions.

One source of weakness in 3D printed objects occurs when successive layers of material fail to sufficiently bond to each other. In particular, if a layer is already partially or wholly solidified or crystallized, then additional material may not bond properly when deposited upon the layer, thus creating a point at the which the object is prone to separation. Accordingly, present invention embodiments improve the bonding strength between layers of a 3D printed object by monitoring the printing job and performing corrective actions, if necessary, during the job. In particular, the printing of an object is monitored to detect any bonding failures, and corrective actions are automatically performed to ameliorate those bonding failures. In some embodiments, a pin can be inserted through two or more layers that have failed to sufficiently bond to each other; the pin can then be printed around with subsequent material to prevent the layers from translating or rotating with respect to each other. Additionally, undesired cavities or air pockets can be filled with additional material. Weak points can also be predicted prior to printing, and bond strengthening actions can be performed to encourage bonding at those sites.

Thus, present invention embodiments improve the field of 3D printing by enabling 3D printers to produce superior objects that are less likely to suffer from bond separation failures. Additionally, present invention embodiments may enable 3D object to be created that have geometries that are unachievable by conventional techniques. Present invention embodiments have the practical application of generating stronger 3D printed objects without the need for manual intervention, as the corrective actions can be performed automatically via a robotic arm or similar device in real-time during the 3D printing process. Moreover, present invention embodiments utilize machine learning and a self-updating knowledge base for identifying and applying corrective actions, thereby increasingly improving the 3D printing process over time.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a 3D printing environment 100 in accordance with an embodiment of the present invention. As depicted, 3D printing environment 100 includes a computing device 105, a 3D printer 130, and a network 190. It is to be understood that the functional division among components of 3D printing environment 100 have been chosen for purposes of explaining present invention embodiments and is not to be construed as a limiting example.

Computing device 105 includes a network interface (I/F) 106, at least one processor 107, memory 110, and a database 125. Memory 110 may include a computer-aided design (CAD) module 115 and a machine learning module 120. Computing device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of computing device 105 to send and receive data over a network, such as network 190. In general, computing device 105 enables a user to design objects for 3D printing jobs and/or to initiate 3D printing jobs (e.g., at 3D printer 130). Computing device 105 may include internal and external hardware components, as depicted and described in further detail with respect to FIG. 7.

CAD module 115 and machine learning module 120 may include one or more modules or units to perform various functions of present invention embodiments described below. CAD module 115 and machine learning module 120 may be implemented by any combination of any quantity of software and/or hardware modules or units, and may reside within memory 110 of computing device 105 for execution by a processor, such as processor 107.

CAD module 115 includes computer-aided design software for creating and editing digital representations of physical objects, including three-dimensional objects that are able to be printed by a 3D printer. CAD module 115 may include any conventional or other modeling software. In some embodiments, CAD module 115 performs analysis of user-generated digital objects to ensure that their physical counterparts would have sufficiently-thick walls, be watertight, and/or satisfy other desired requirements. CAD module 115 may output data including a digital template of a 3D object that includes, or can be converted to, instructions for 3D printing the physical object.

Machine learning module 120 includes a machine learning model that can be trained to classify images in order to identify features depicted in the images. Machine learning module 120 may train machine learning models, such as neural networks (including artificial neural networks, convolutional neural networks, recurrent neural networks, etc.), K nearest neighbor models, decision tree models, support vector machine models, and the like. Machine learning module 120 may generate a trained image classifier using a set of training data that includes images of 3D printed objects that include, or do not include, defects, and are labeled accordingly. In particular, the training data may include images of objects being printed that do not include defects, and are labeled as such, and images of objects being printed that include defects, such as cavities (i.e., air bubbles internal to the object) and/or bonding failures between layers. As the images may include features that are internal to an object, the images may be obtained via techniques such as sonography/ultrasound, x-ray, and/or other suitable techniques.

Machine learning module 120 may output a trained image classifier model that can be provided with input images of a physical object being printed. As output, the trained image classifier model can indicate whether an input image corresponds to a defect in an object being 3D-printed. In some embodiments, the trained classifier may further indicate the type of defect, such as an internal cavity, bonding failure, and the like. Machine learning module 120 may provide a trained image classifier model to object analysis module 170 of 3D printer 130, where the trained model is utilized during 3D printing jobs.

Database 125 may include any non-volatile storage media known in the art. For example, database 125 can be implemented with a tape library, optical library, one or more independent hard disk drives, or multiple hard disk drives in a redundant array of independent disks (RAID). Similarly, data in database 125 may conform to any suitable storage architecture known in the art, such as a file, a relational database, an object-oriented database, and/or one or more tables. In some embodiments, database 125 may store data relating to CAD data, including digital representations of physical 3D-printable objects. Additionally or alternatively, database 125 may store results of training conventional or other image classifier models, labeled training data, and the like.

3D printer 130 includes a network interface (I/F) 131, at least one processor 132, printing components 135, a robotic arm 140, scanning modules 145A-145N, an internal printing module 150, a laser module 155, memory 160, and a database 185. Memory 160 may include a job execution module 165, an object analysis module 170, a defect correction module 175, and a knowledge base module 180. 3D printer 130 may include any conventional or other 3D printer, including corresponding structure to support 3D printing components, computing components for controlling the 3D printing components, and the like. Network interface 131 enables components of 3D printer to send and receive data over a network, such as network 190. In general, 3D printer 130 creates objects by executing 3D printing jobs in accordance with present invention embodiments. 3D printer 130 may include internal and external hardware components, as depicted and described in further detail with respect to FIG. 7.

Printing components 135 may include any conventional or other components for performing 3D printing tasks, including mechanical components for depositing materials, such as one or more computer-controllable nozzles, printing materials, tubing and storage for the materials, heating components (e.g., for embodiments in which the material is a plastic that hardens upon cooling), ultraviolet components (e.g., for embodiments in which the material includes a resin that solidifies upon exposure to ultraviolet light), a surface or printing bay to support an object being printed, and other components, such as structural components to support other functional components, and the like. The material may include any conventional or other 3D printing materials, or combinations of materials, such as acrylonitrile butadiene styrene-based printing materials, polyactic acid-based printing materials, polyethylene terephthalate-based printing materials, nylon-based printing materials, and the like.

Robotic arm 140 may include a computer-controllable arm for performing corrective operations according to present invention embodiments. Robotic arm 140 may execute instructions provided by defect correction module 175 and/or other modules of 3D printing environment 100 in order to correct any defects that occur during a 3D printing job. In particular, some or all of laser module 155 may be incorporated into robotic arm 140 to perform laser drilling operations, and/or robotic arm 140 may manipulate pins in order to insert pins into an object that is being printed. Additionally, internal printing module 150 may be incorporated into robotic arm 140 to enable injection of printing material into a cavity inside of an object, which can be accessed via a laser-drilled hole.

Robotic arm 140 may have one or more joints to provide a desired number of degrees of freedom so that robotic arm 140 can orbit around or otherwise access any portion of an object being printed by 3D printer 130. For example, robotic arm 140 may include any combination of linear joints, orthogonal joints, rotational joints, twisting joints, and/or revolving joints so that a distal end of robotic arm 140 can approach an object currently being printed from any desired path of approach. Thus, robotic arm 140 may use laser module 155 to drill a hole into an object at any desired location and/or angle, may use internal printing module 150 to insert materials inside of a hole to fill a cavity, and/or may insert a pin in an object via robotic fingers or grippers included in robotic arm 140.

In some embodiments, robotic arm 140 includes one or more cameras and utilizes machine vision in order to orientate robotic arm 140 with respect to an object being printed. In some embodiments, robotic arm 140 may utilize knowledge of print job from other components, such as printing components 135, scanning modules 145A-145N, and/or job execution module 165 to determine where to robotic arm 140 should be positioned to perform corrective operations.

Scanning modules 145A-145N include one or more modules that are positioned around a printing bay of 3D printer 130 in order to image an object as the object is printed. Scanning modules 145A-145N may include ultrasound and/or x-ray imaging techniques in order to obtain images that include details of the internal structure of an object being printed. Scanning modules 145A-145N may obtain image data continuously during a printing job or on an ad hoc basis, such as after each layer is printed, after a predetermined number of layers are printed, after a predetermined amount of time has elapsed, and the like. Data obtained by scanning modules 145A-145N may be provided to object analysis module 170.

Internal printing module 150 enables injection of printing material into an object. In some embodiments, some or all of internal printing module 150 are incorporated into a distal end of robotic arm 140, and can be inserted into a hole that is laser-drilled by laser module 155 to enable filling of a cavity inside of an object (as well as the laser-drilled hole). In some embodiments, internal printing module 150 may not be associated with robotic arm 140, and may instead be a separate module that can be controlled by job execution module 165 or defect correction module 175 in order to perform internal printing operations.

Laser module 155 may include one or more lasers that can heat up and/or ablate printing materials utilized by 3D printer 130. In particular, laser module 155 may be able to remove previously-printed material through ablation by imparting sufficient energy onto the material via a focused laser beam. Laser module 155 can perform laser drilling by applying a continuous beam, or repeatedly pulsing a beam, onto a particular portion of an object that is being 3D printed. Additionally or alternatively, laser module 155 can perform pre-heating of portions of an object upon which another layer of material will soon be deposited to encourage bonding. In some embodiments, laser module 155 laser-etches a pattern into a layer of material, such as a repeating pattern of grooves or holes, or some other texture, in order to create a more textured surface that will more readily bond with another layer that is deposited upon the textured surface.

Job execution module 165, object analysis module 170, defect correction module 175, and knowledge base module 180 may include one or more modules or units to perform various functions of present invention embodiments described below. Job execution module 165, object analysis module 170, defect correction module 175, and knowledge base module 180 may be implemented by any combination of any quantity of software and/or hardware modules or units, and may reside within memory 160 of 3D printer 130 for execution by a processor, such as processor 132.

Job execution module 165 controls printing components 135 in order to execute a 3D printing job. Job execution module 165 may be provided with instructions that enable 3D printer 130 to print a particular object, or may receive a digital template of a 3D object, such as a CAD file, which job execution module 165 may then convert into a series of instructions for printing an object. In general, job execution module 165 may execute instructions to control the movement of nozzles and the application of material from nozzles; the instructions for a printing job can be executed as a series of steps that are organized in a layer-by-layer fashion. Job execution module 165 may perform any other tasks associated with a 3D printing job, such as determining that there is enough material to complete the job, estimating an amount of time required to complete a job and reporting the estimated job duration to a user, and the like.

Object analysis module 170 may analyze data collected by scanning modules 145A-145N in order to identify defects during a printing job. In some embodiments, object analysis module 170 may identify defects based on predefined criteria. For example, an ultrasonic pulse can be directed at an object, and predefined characteristics of the echo of the pulse (e.g., the timing and/or energy of the echo) may indicate that there is a separation in the bonding of layers, or a cavity, in the internal structure of the object. In some embodiments, object analysis module 170 employs a trained image classifier that is provided data collected by scanning modules 145A-145N, including images produced by ultrasound and/ or x-ray. The image classifier may then identify the presence of bonding failures in layers of an object and/or cavities inside of the object.

In some embodiments, object analysis module 170 analyzes the object being printed in combination with material properties of the material of the object, such as cohesive strength, density, melting points, crystallization parameters, and the like, in order to predict the bonding strength required between layers and to identify potentially weak portions of the object at which the bonding strength is unlikely to meet the necessary requirements. Object analysis module 170 can flag any potentially weak portions as including a defect regardless of whether a defect is actually detected or not (e.g., based on analysis of data collected by scanning modules 145A-145N), so that defect correction module 175 can strengthen any potentially weak portions of an object. In some embodiments, object analysis module 170 predicts defects by comparing the object, including various cross sections of the object, to the knowledge corpus to determine whether defects are historically associated with the printing of objects that have same or similar geometries.

Defect correction module 175 may provide instructions to robotic arm 140, internal printing module 150, and/or laser module 155 to perform corrective operations in response to object analysis module 170 identifying a defect. The corrective operations may be received by knowledge base module 180, which stores a knowledge corpus of defects and corresponding corrective operations. Defect correction module 175 may select corrective operations from the knowledge corpus based on a comparison of a detected defect to defects in the corpus. In particular, defect correction module 175 may use a size and type of a defect to select corrective operations. For example, defect correction module 175 may correct a cavity defect by finding an example of a similarly-sized cavity, and its corresponding corrective operation, in the knowledge corpus. When there is not an exact match, the corrective operations may be scaled accordingly. For example, if the current cavity is 5% larger than an example cavity in the knowledge corpus, then 5% more fill material may be utilized in a corrective operation. Thus, defect correction module 175 can cause corrective operations to be performed, including laser drilling and filling of a cavity, laser drilling and insertion of a pin to hold two layers of material together, and the like.

Knowledge base module 180 maintains a knowledge corpus in which defects and corresponding corrective operations for those defects are stored. Defects may be described by both qualitative and quantitative information, including the type of defect (e.g., cavity, bonding weakness) and the size of the defect, which can include a two-dimensional or three-dimensional span of the defect inside of the object. For each described defect, a corresponding set of corrective operations can be included, which may include laser drilling and filling of a cavity, or laser drilling and insertion of a pin. The knowledge corpus may be updated upon completion of a printing job to include any defects that occurred during the printing process and the corrective operations that were applied. In addition, the knowledge corpus may include a description of the portion of an object at which a defect occurred, including the cross sectional area, type of material used for the object, and the like.

Network 190 may include a local area network (LAN), a wide area network (WAN) such as the Internet, or a combination of the two, and includes wired, wireless, or fiber optic connections. In general, network 190 can be any combination of connections and protocols known in the art that will support communications between computing device 105 and 3D printer 130 via their respective network interfaces in accordance with embodiments of the present invention.

Figure 2A:
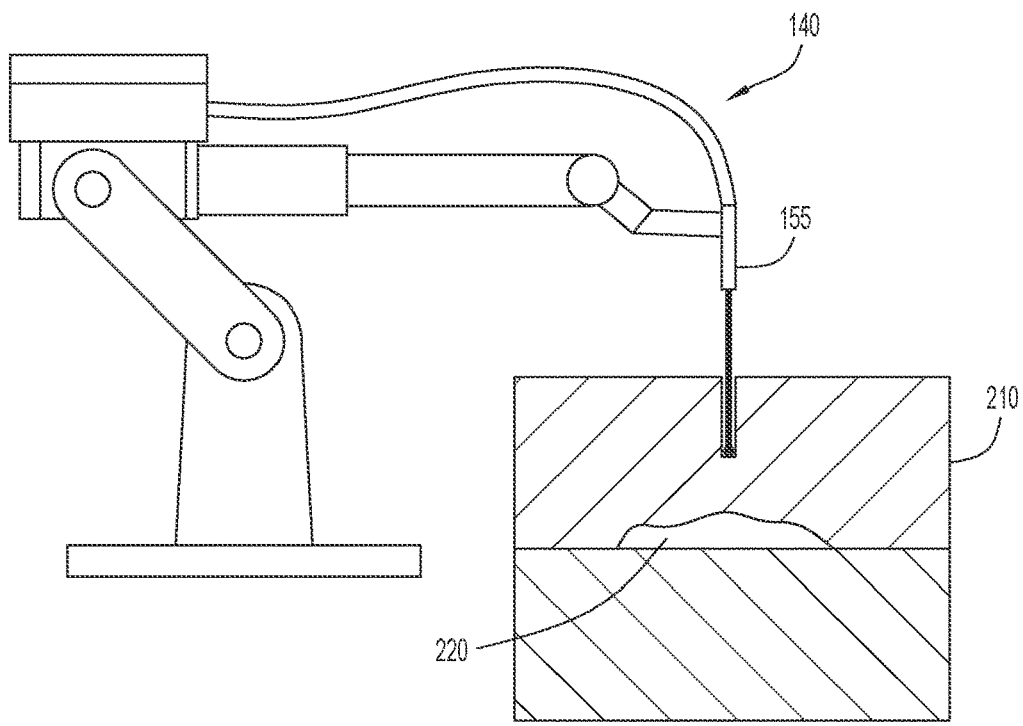
FIG. 2A is a diagram depicting a robotic arm including a laser module for drilling into a cavity in accordance with an embodiment of the present invention.

FIG. 2A is a diagram depicting a robotic arm 140 including a laser module 155 for drilling into a cavity in accordance with an embodiment of the present invention. As depicted, an object 210 that is being 3D printed includes a cavity 220, which can form either at deposition or during solidification of the material. Robotic arm 140 is orientated such that laser module 155 can perform laser drilling through the material of object 210 and into cavity 220.

Figure 2B:
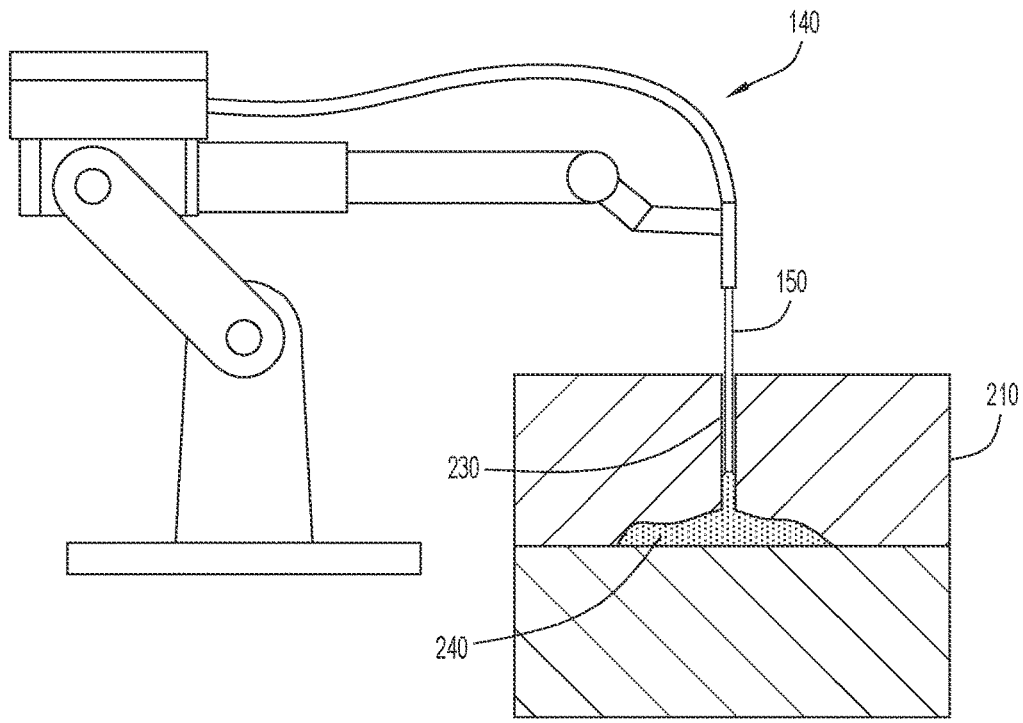
FIG. 2B is a diagram depicting a robotic arm that is filling a cavity using an internal printing module in accordance with an embodiment of the present invention.

FIG. 2B is a diagram depicting a robotic arm 140 that is filling a cavity of an object 210 using an internal printing module 150 in accordance with an embodiment of the present invention. The embodiment depicted in FIG. 2B may correspond to a same embodiment depicted in FIG. 2A or another embodiment. In some embodiments, laser module 155 and internal printing module 150 may be incorporated into a same robot arm 140, whereas other embodiments may incorporate laser module 155 into one robotic arm 140, and internal printing module 150 into another robotic arm 140.

As depicted in FIG. 2B, laser drilling of a channel 230 into the cavity has completed, and internal printing module 150 inserts additional printing material to fill the cavity. Internal printing module 150 may include a rigid or flexible tube portion that can be inserted into channel 230 in order to perform the internal printing operations. The corrective action is complete when the cavity is filled with additional material 240, which can be determined a priori based on an estimated size of the cavity. In some embodiments, the cavity filling operation is monitored using image data acquired by scanning modules 145A-145N, which can provide the image data to object analysis module 170 for determining whether the cavity has been filled.

Figure 3:
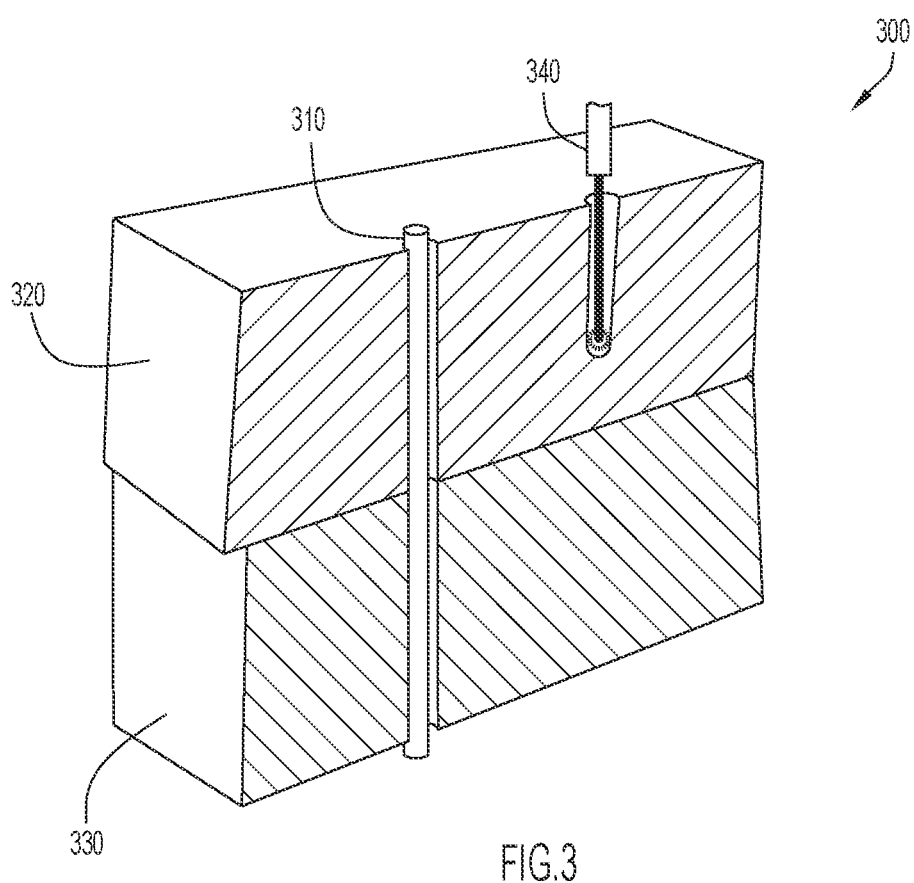
FIG. 3 is a diagram depicting a pin for holding layers of material together in accordance with an embodiment of the present invention.

FIG. 3 is a diagram depicting a pin 310 for holding layers of material of an object 300 together in accordance with an embodiment of the present invention. As depicted, object 300 has experienced a bonding failure between two layers 320 and 330. Accordingly, a hole has been drilled through at least a portion of both layers 320 and 330, and pin 310 has been inserted into the hole. A portion of pin 310 may extend outwardly from the top surface of the top layer 320 so that the extending portion of pin 310 can be printed around during deposition of one or more subsequent layers of material, thus fixing pin 310 in place. Also depicted is laser 340 drilling another hole for another pin; depending on the size of the area in which layers fail to bond to each other, a number of pins may be inserted.

Figure 4:
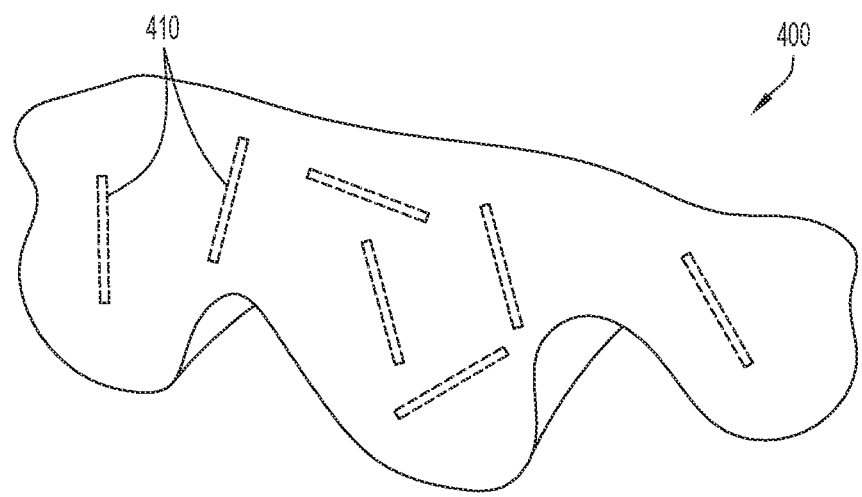
FIG. 4 is a diagram depicting a 3D printed object with internal pins in accordance with an embodiment of the present invention.

FIG. 4 is a diagram depicting a 3D printed object 400 with internal pins 410 in accordance with an embodiment of the present invention. As depicted, printing of 3D printed object 400 is completed; during the printing job, a number of pins 410 were inserted. As the printing job continues, the pins 410 are surrounded by subsequently-deposited material, which holds the pins in place and prevents layers that failed to bond to each other from translating or rotating past each other in the completed 3D printed object 400.

Figure 5:
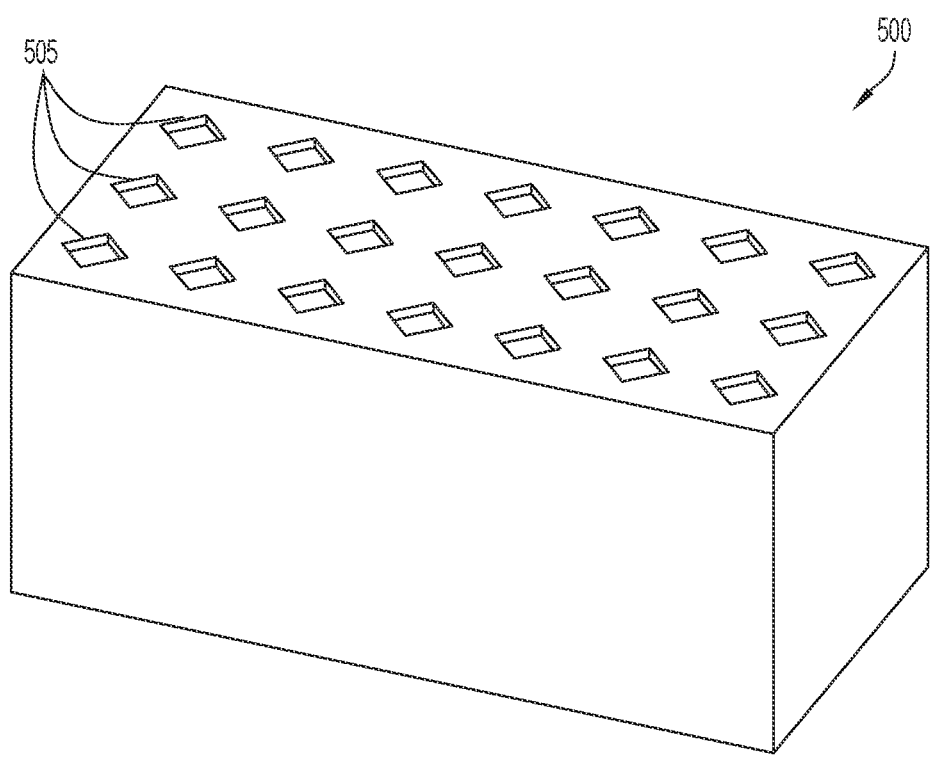
FIG. 5 is a diagram depicting an object being printed in which a pattern is laser-etched into a top layer of material in accordance with an embodiment of the present invention.

FIG. 5 is a diagram depicting an object 500 being printed in which a pattern is laser-etched into a top layer of material in accordance with an embodiment of the present invention. The pattern may be etched due to detection of an actual failure or weakness or prediction of a potential failure or weakness. As the printing job continues, subsequent material will be deposited on the top surface of object 500. As shown, the pattern on the top surface includes a plurality of diamond-shaped holes 505 that will provide friction and additional structure for a subsequently-deposited layer to grip the object 500. The pattern can be created by a laser etching process that is performed using laser module 155, and can include any pattern or texture, such as repeating notches or grooves, an irregular texture, and the like.

Figure 6:
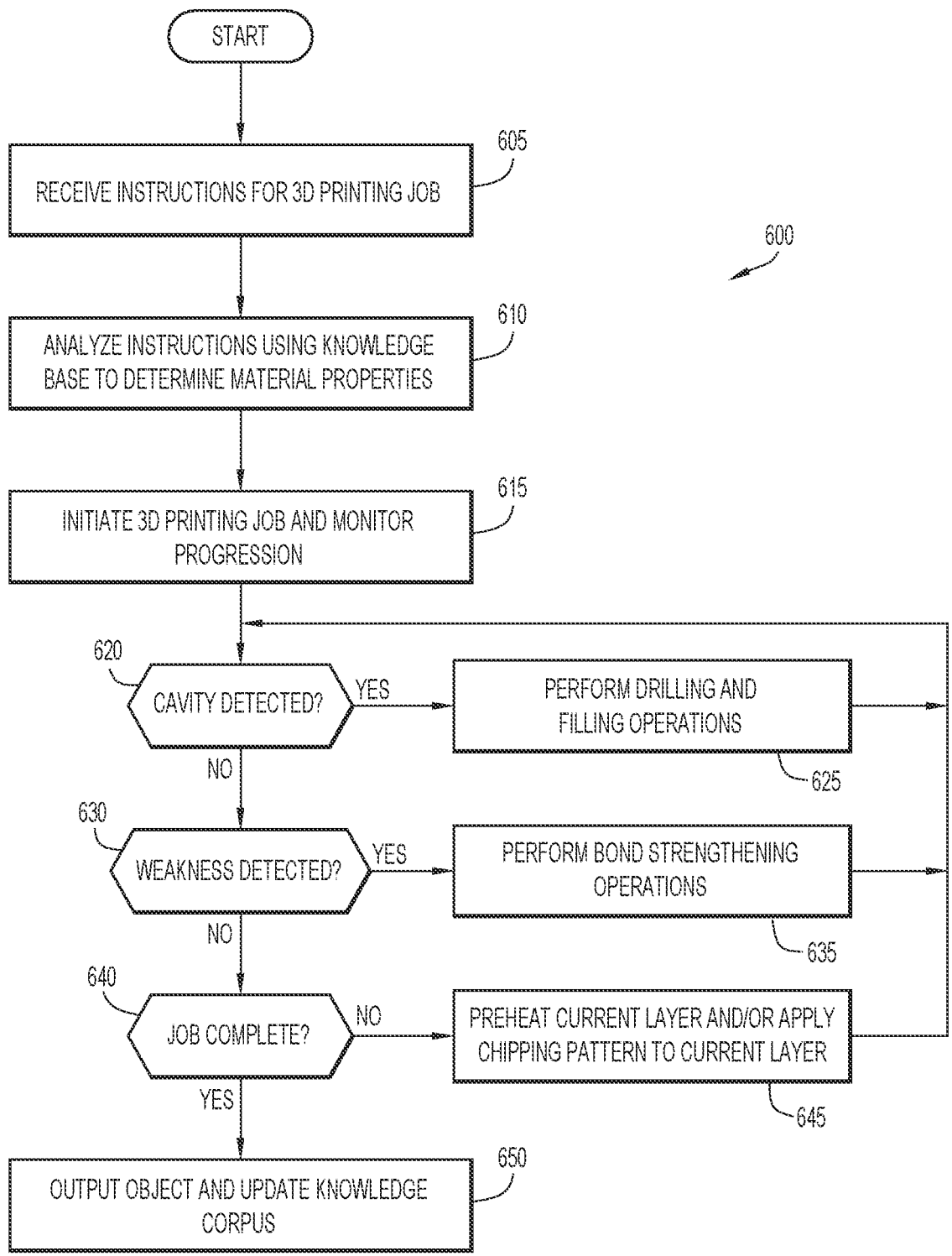
FIG. 6 is flow chart depicting a method of 3D printing a physical object in accordance with an embodiment of the present invention.

FIG. 6 is flow chart depicting a method 600 of 3D printing a physical object in accordance with an embodiment of the present invention.

Instructions for printing the 3D object are received at operation 605. The instructions may be provided to job execution module 165 of 3D printer 130, or may be generated by job execution module 165 based on a digital template of a three-dimensional object, such as a CAD file. The instructions may include instructions to deposit material to print an object, and may also define the material that is to be deposited.

The instructions are analyzed using the knowledge base to determine material properties at operation 610. The object may be analyzed based on the object's dimensions, the material properties of materials used to generate the object, and/or intended use-cases of the object to determine the necessary bonding strengths between successively-printed layers of the object. The object may be analyzed by comparing the object to similar objects in the knowledge base (e.g., objects having same or similar dimensions, cross-sectional areas, and/or strength requirements) in order to determine whether any of the portions of the object are considered to be potentially weak portions and may therefore require strengthening, e.g., by inserting pins, pre-eating layers of material, and/or applying patterns to layers of the material.

The 3D printing job is initiated, and progression of the job is monitored at operation 615. Scanning modules 145A-145N may capture images of the object being printed, which can be analyzed by object analysis module 170 to identify any defects using a trained image classifier. Operation 620 determines whether a cavity is detected. If object analysis module 170 detects a cavity, then laser drilling into the cavity and filling of the cavity is performed at operation 625, the print job resumes, and object analysis module 170 continues to monitor for defects.

If a weak bond is detected between layers at operation 630, then, bond strengthening operations are performed at operation 635, the print job resumes, and object analysis module 170 continues to monitor for defects. The weak bond may be addressed by laser drilling through at least a portion of both layers that are associated with the weak bond, and inserting a pin through both layers, leaving a portion of the pin extended out through at least a portion of one of the layers. Defect correction module 175 may consult the knowledge corpus maintained by knowledge base module 180 to determine the number of pins and spacing of pins to perform a bond strengthening operation.

If there is no cavity or weak bonding detected, operation 640 determines whether the progress to the next layer, or to continue printing the current layer. If there is at least one more layer of material to be printed, bond strengthening actions may be performed at operation 645 by preheating and/or applying a chipping pattern to the current layer to encourage bonding with a subsequently-deposited layer, which is deposited when printing resumes and progression is again monitored by object analysis module 170. The bond strengthening actions (pre-heating operations and/or chipping operations) may optionally be performed only on portions of an object that are potentially weak (i.e., as indicated by the knowledge corpus) or may be applied at every layer. Printing may proceed layer-by-layer, with any defects being identified and repaired automatically until the job is finished.

If the job is complete, the printed object is output and the knowledge corpus is updated at operation 650. The knowledge corpus may thus be continuously updated with a history of corrective actions and corresponding shapes and/or materials of objects, so that corrective operations can be anticipated in future similar printing jobs, and/or strengthening operations automatically applied.

Figure 7:
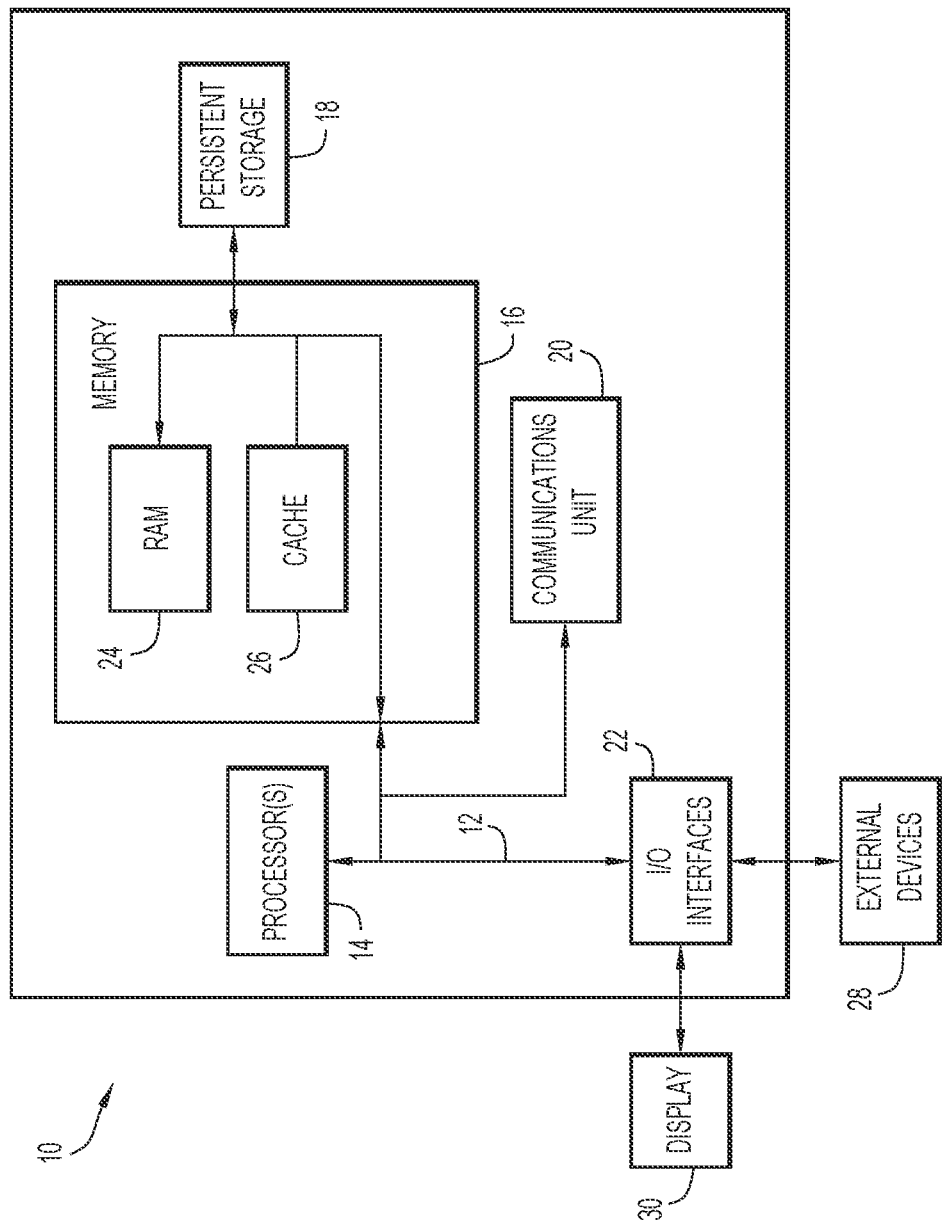
FIG. 7 is a block diagram depicting a computing device in accordance with an embodiment of the present invention.

FIG. 7 is a block diagram depicting components of a computer 10 suitable for executing the methods disclosed herein. Computer 10 may implement computing device 105 and/or corresponding computing components of 3D printer 130 in accordance with embodiments of the present invention. It should be appreciated that FIG. 7 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to performing corrective operations during 3D print jobs (e.g., training data, trained classifier model data, CAD data, printing instructions, scanning module data, knowledge corpus data, etc.) may be stored within any conventional or other data structures (e.g., files, arrays, lists, stacks, queues, records, etc.) and may be stored in any desired storage unit (e.g., database, data or other repositories, queue, etc.). The data transmitted between computing device 105 and 3D printer 130 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to performing corrective operations during 3D print jobs (e.g., training data, trained classifier model data, CAD data, printing instructions, scanning module data, knowledge corpus data, etc.) may include any information provided to, or generated by, computing device 105 and/or 3D printer 130. Data relating to performing corrective operations during 3D print jobs may include any desired format and arrangement, and may include any quantity of any types of fields of any size to store any desired data. The data relating to performing corrective operations during 3D print jobs may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to performing corrective or other operations during 3D print jobs), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving 3D printing by automatically performing corrective and/or strengthening operations during the printing process.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, CAD module 115, machine learning module 120, job execution module 165, object analysis module 170, defect correction module 175, knowledge base module 180, etc.). These systems may include any types of monitors and input devices (e.g., keyboard, mouse, voice recognition, etc.) to enter and/or view information.

It is to be understood that the software (e.g., communications software, CAD module 115, machine learning module 120, job execution module 165, object analysis module 170, defect correction module 175, knowledge base module 180, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, CAD module 115, machine learning module 120, job execution module 165, object analysis module 170, defect correction module 175, knowledge base module 180, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to performing corrective or other operations during 3D print jobs). The database system may be implemented by any number of any conventional or other databases, data stores or storage structures (e.g., files, databases, data structures, data or other repositories, etc.) to store information (e.g., data relating to performing corrective or other operations during 3D print jobs). The database system may be included within or coupled to the server and/or client systems. The database systems and/or storage structures may be remote from or local to the computer or other processing systems, and may store any desired data (e.g., data relating to performing corrective or other operations during 3D print jobs).

The present invention embodiments may employ any number of any type of user interface (e.g., Graphical User Interface (GUI), command-line, prompt, etc.) for obtaining or providing information (e.g., data relating to performing corrective or other operations during 3D print jobs), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, improving the output of any type of 3D printing/additive manufacturing task.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for performing corrective operations during a three-dimensional (3D) printing job, the method comprising:
    initiating the 3D printing job to produce a physical object;
    monitoring printing of the physical object to identify a defect of the physical object during the printing, wherein the defect includes a weak bonding of adjacently-deposited layers of the physical object;
    analyzing the defect to determine one or more corrective operations to apply to the physical object; and
    performing the one or more corrective operations during the printing, wherein the one or more corrective operations include laser drilling a plurality of spaces that each pass through at least a portion of both of the adjacently-deposited layers and inserting a pin into each space, and wherein the plurality of spaces and the pin in each space are at different angles from each other with respect to the physical object.

2. The computer-implemented method of claim 1, wherein the monitoring includes obtaining one or more images of the physical object during the printing of the physical object, and wherein a trained image classifier model processes the one or more images to identify the defect of the physical object.

3. The computer-implemented method of claim 1, wherein the monitoring employs one or more from a group of: an ultrasound imaging device, and an x-ray imaging device.

4. The computer-implemented method of claim 1, wherein the defect further includes a cavity inside of the physical object, and wherein the one or more corrective operations include laser drilling into the cavity and filling the cavity with material.

5. The computer-implemented method of claim 1, further comprising:
    performing one or more bond strengthening actions during the printing, wherein the one or more bond strengthening actions are performed prior to depositing a second layer of material over a first layer of material of the physical object, and wherein the one or more bond strengthening actions comprise preheating the first layer of material.

6. The computer-implemented method of claim 1, wherein a knowledge corpus is used to determine the one or more corrective operations, the knowledge corpus including a plurality of defects and corresponding corrective operations, and wherein the computer-implemented method further comprises:
    updating the knowledge corpus based on the one or more performed corrective operations.

7. A computer system for performing corrective operations during a three-dimensional (3D) printing job, the computer system comprising:
    one or more computer processors;
    one or more computer readable storage media;
    program instructions stored on the one or more computer readable storage media for execution by at least one of the one or more computer processors, the program instructions comprising instructions to:

initiate the 3D printing job to produce a physical object;
monitor printing of the physical object to identify a defect of the physical object during the printing, wherein the defect includes a weak bonding of adjacently-deposited layers of the physical object;
analyze the defect to determine one or more corrective operations to apply to the physical object; and
perform the one or more corrective operations during the printing, wherein the one or more corrective operations include laser drilling a plurality of spaces that each pass through at least a portion of both of the adjacently-deposited layers and inserting a pin into each space, and wherein the plurality of spaces and the pin in each space are at different angles from each other with respect to the physical object.

8. The computer system of claim 7, wherein the monitoring includes obtaining one or more images of the physical object during the printing of the physical object, and wherein a trained image classifier model processes the one or more images to identify the defect of the physical object.

9. The computer system of claim 7, wherein the monitoring employs one or more from a group of: an ultrasound imaging device, and an x-ray imaging device.

10. The computer system of claim 7, wherein the defect further includes a cavity inside of the physical object, and wherein the one or more corrective operations include laser drilling into the cavity and filling the cavity with material.

11. The computer system of claim 7, wherein the program instructions further comprise instructions to perform one or more bond strengthening actions during the printing, wherein the one or more bond strengthening actions are performed prior to depositing a second layer of material over a first layer of material of the physical object, and wherein the one or more bond strengthening actions comprise preheating the first layer of material.

12. The computer system of claim 7, wherein a knowledge corpus is used to determine the one or more corrective operations, the knowledge corpus including a plurality of defects and corresponding corrective operations, and wherein the program instructions further comprise instructions to:
update the knowledge corpus based on the one or more performed corrective operations.

13. A computer program product for performing corrective operations during a three-dimensional (3D) printing job, the computer program product comprising one or more computer readable storage media collectively having program instructions embodied therewith, the program instructions executable by a computer to cause the computer to:
initiate the 3D printing job to produce a physical object;
monitor printing of the physical object to identify a defect of the physical object during the printing, wherein the defect includes a weak bonding of adjacently-deposited layers of the physical object;
analyze the defect to determine one or more corrective operations to apply to the physical object; and
perform the one or more corrective operations during the printing, wherein the one or more corrective operations include laser drilling a plurality of spaces that each pass through at least a portion of both of the adjacently-deposited layers and inserting a pin into each space, and wherein the plurality of spaces and the pin in each space are at different angles from each other with respect to the physical object.

14. The computer program product of claim 13, wherein the monitoring includes obtaining one or more images of the physical object during the printing of the physical object, and wherein a trained image classifier model processes the one or more images to identify the defect of the physical object.

15. The computer program product of claim 13, wherein the monitoring employs one or more from a group of: an ultrasound imaging device, and an x-ray imaging device.

16. The computer program product of claim 13, wherein the defect further includes a cavity inside of the physical object, and wherein the one or more corrective operations include laser drilling into the cavity and filling the cavity with material.

17. The computer program product of claim 13, wherein the program instructions further comprise instructions to perform one or more bond strengthening actions during the printing, wherein the one or more bond strengthening actions are performed prior to depositing a second layer of material over a first layer of material of the physical object, and wherein the one or more bond strengthening actions comprise preheating the first layer of material.

* * * * *